US009542951B2

(12) United States Patent
Oh et al.

(10) Patent No.: US 9,542,951 B2
(45) **Date of Patent: *Jan. 10, 2017**

(54) METHOD AND AN APPARATUS FOR PROCESSING AN AUDIO SIGNAL

(71) Applicant: LG ELECTRONICS INC., Seoul (KR)

(72) Inventors: Hyen-O Oh, Seoul (KR); Yang Won Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

This patent is subject to a terminal disclaimer.

(21) Appl. No.: 14/137,556

(22) Filed: Dec. 20, 2013

(65) Prior Publication Data

US 2014/0105424 A1 Apr. 17, 2014

Related U.S. Application Data

(63) Continuation of application No. 12/690,837, filed on Jan. 20, 2010, now Pat. No. 8,620,008.

(Continued)

(30) Foreign Application Priority Data

Jan. 19, 2010 (KR) ........................ 10-2010-0004817

(51) Int. Cl.

*H04B 1/00* (2006.01)
*H04R 5/00* (2006.01)

(Continued)

(52) U.S. Cl.

CPC ............... *G10L 19/008* (2013.01); *H04S 7/30* (2013.01); *H04S 3/00* (2013.01); *H04S 3/02* (2013.01); *H04S 2420/03* (2013.01)

(58) Field of Classification Search

CPC .......... H04S 3/00; H04S 3/02; H04S 2420/03; G10L 19/008

(Continued)

(56) References Cited

U.S. PATENT DOCUMENTS 7,783,051 B2 8/2010 Oh et al.
8,311,227 B2 11/2012 Oh et al.

(Continued)

FOREIGN PATENT DOCUMENTS

CN 101185118 A 5/2008
KR 10-2010-0063120 A 6/2010

(Continued)

OTHER PUBLICATIONS

Engdegard et al., "Spatial Audio Object Coding (SACC)—The Upcoming MPEG Standard on Parametric Object Based Audio Coding", AES 124th Convention, Amsterdam, The Netherlands, XP-002541458, May 17-20, 2008, pp. 1-15.

(Continued)

*Primary Examiner* — Xu Mei

(74) *Attorney, Agent, or Firm* — Birch, Stewart, Kolasch & Birch, LLP

(57) ABSTRACT

An apparatus for processing an audio signal and method thereof, the method including receiving a downmix signal including at least one normal object signal, and a bitstream including object information determined when the downmix signal is generated; extracting, from an extension part of the bitstream, an extension type identifier indicating whether the downmix signal further includes a multi-channel object signal; generating spatial information using the object information and mix information when mode information indicates that the multi-channel object signal is to be suppressed and the extension type identifier indicates that the downmix signal further includes the multi-channel object signal; and (Continued)

transmitting spatial information. The mix information is to control an object position or an object level of the at least one normal object signal.

7 Claims, 20 Drawing Sheets

Related U.S. Application Data

(60) Provisional application No. 61/145,744, filed on Jan. 20, 2009, provisional application No. 61/145,749, filed on Jan. 20, 2009, provisional application No. 61/148,048, filed on Jan. 28, 2009, provisional application No. 61/148,387, filed on Jan. 29, 2009, provisional application No. 61/149,345, filed on Feb. 3, 2009.

(51) Int. Cl.

| | |
|---|---|
| ***G10L 19/008*** | (2013.01) |
| ***H04S 7/00*** | (2006.01) |
| *H04S 3/02* | (2006.01) |
| *H04S 3/00* | (2006.01) |

(58) Field of Classification Search
USPC ...... 381/22, 23, 20, 94.1–94.3, 119; 700/94; 369/4
See application file for complete search history.

(56) References Cited

U.S. PATENT DOCUMENTS

| | | | | |
|---|---|---|---|---|
| 8,359,113 | B2 | 1/2013 | Oh et al. | |
| 8,364,497 | B2 * | 1/2013 | Beack | G10L 19/008 381/2 |
| 8,620,008 | B2 * | 12/2013 | Oh | G10L 19/008 369/4 |
| 8,670,989 | B2 * | 3/2014 | Beack | G10L 19/008 381/2 |
| 8,725,279 | B2 * | 5/2014 | Oh | G10L 19/008 381/119 |
| 2007/0223709 | A1 | 9/2007 | Kim et al. | |
| 2008/0052089 | A1 | 2/2008 | Takagi | |
| 2009/0125314 | A1 | 5/2009 | Hellmuth et al. | |

FOREIGN PATENT DOCUMENTS

| | | | |
|---|---|---|---|
| WO | WO 2005/122639 | A1 | 12/2005 |
| WO | WO 2008/039038 | A1 | 4/2008 |
| WO | WO 2008/069593 | A1 | 6/2008 |
| WO | WO 2008/114982 | A1 | 9/2008 |
| WO | WO 2008/120933 | A1 | 10/2008 |
| WO | WO 2009/049895 | A1 | 4/2009 |

OTHER PUBLICATIONS

Herre et al., "New Concepts in Parametric Coding of Spatial Audio: From SAC to SAOC", IEEE Multimedia and Expo., Jul. 2-5, 2007, pp. 1894-1897.

* cited by examiner

FIG. 3

Table 1 – Syntax of SAOCExtensionConfig()

| Syntax | No. of bits | Mnemonic | |
|---|---|---|---|
| SAOCExtensionConfig() | | | |
| { | | | |
| SaocExtNum = 0; | | | |
| while (BitsAvailable() >= 8) { | | Note 1 | |
| **bsSaocExtType**; | 4 | **uimsbf** | (A) |
| SaocExtType[SaocExtNum] = bsSaocExtType; | | | |
| SaocExtNum++; | | | |
| cnt = **bsSaocExtLen**; | 4 | **uimsbf** | |
| if (cnt==15) { | | | |
| cnt += **bsSaocExtLenAdd**; | 8 | **uimsbf** | |
| } | | | |
| if (cnt==15+255) { | | | |
| cnt += **bsSaocExtLenAddAdd**; | 16 | **uimsbf** | |
| } | | | |
| bitsRead = SAOCExtensionConfigData(bsSaocExtType) | | Note 2 | (B) |
| nFillBits = 8*cnt-bitsRead; | | | |
| **bsFillBits**; | **nFillBits** | **bslbf** | |
| } | | | |
| } | | | |
| } | | | |
| Note 1: The function BitsAvailable() returns the number of bits available to be read. | | | |
| Note 2: SAOCExtensionConfigData() returns the number of bits read. | | | |

FIG. 4

Table 2A – Syntax of SAOCExtensionConfigData(x)

| Syntax | No. of bits | Mnemonic |
|---|---|---|
| SAOCExtensionConfigData(x) | | |
| { | | |
| **bsMBOIs**; | **5** | **Uimsbf** |
| SpatialSpecificConfig(); | | |
| } | | |

Table 2B – Syntax of SAOCExtensionConfigData(x)

| Syntax | No. of bits | Mnemonic |
|---|---|---|
| SAOCExtensionConfigData(x) | | |
| { | | |
| **bsMBOIs**; | **nBitsMBO** | NOTE |
| SpatialSpecificConfig(); | | |
| } | | |

Note: nBitsMBO = ceil($\log_2$(bsNumObjects))

Table 2C – Syntax of SAOCExtensionConfigData(x)

| Syntax | No. of bits | Mnemonic |
|---|---|---|
| SAOCExtensionConfigData(x) | | |
| { | | |
| **bsMBOIs**; | **5** | **uimsbf** |
| SpatialSpecificConfig(); | | |
| If (frame is contained in the header) { | | |
| SpatialFrame(); | | |
| } | | |
| } | | |

FIG. 5

Table 3A – Syntax of SAOCExtensionFrameData(x)

| Syntax | No. of bits | Mnemonic |
|---|---|---|
| SAOCExtensionFrameData(x) | | |
| { | | |
| SpatialFrame(); | | |
| } | | |

FIG. 6

Table 3B.1 – Syntax of SAOCExtensionFrameData(x)

| Syntax | No. pf bits | Mnemonic |
|---|---|---|
| SAOCExtensionFrameData(x) | | |
| { | | |
| MBOFrame(); | | |
| } | | |

Table 3B.2 – Syntax of MBOFrame()

| Syntax | No. of bits | Mnemonic |
|---|---|---|
| MBOFrame() | | |
| { | | |
| SpatialFrame(); | | |
| } | | |

FIG. 7

Table 4 – Syntax of SpatialSpecificConfig()

| Syntax | No. of bits | Mnemonic |
|---|---|---|
| SpatialSpecificConfig() | | |
| { | | |
| bsSamplingFrequencyIndex; | 4 | uimsbf |
| if ( bsSamplingFrequencyIndex == 0xf ) { | | |
| bsSamplingFrequency; | 24 | uimsbf |
| } | | |
| bsFrameLength; | 7 | uimsbf |
| bsFreqRes; | 3 | uimsbf |
| bsTreeConfig; | 4 | uimsbf |
| bsQuantMode; | 2 | uimsbf |
| bsOneIcc; | 1 | uimsbf |
| bsArbitraryDownmix; | 1 | uimsbf |
| bsFixedGainSur; | 3 | uimsbf |
| bsFixedGainLFE; | 3 | uimsbf |
| bsFixedGainDMX; | 3 | uimsbf |
| bsMatrixMode; | 1 | uimsbf |
| bsTempShapeConfig; | 2 | uimsbf |
| bsDecorrConfig; | 2 | uimsbf |
| bs3DaudioMode; | 1 | uimsbf |
| SpatialExtensionConfig(); | | |
| } | | |

Note 1: numOttBoxes and numTttBoxes are defined by dependent on bsTreeConfig.

FIG. 8

Table 5 – Syntax of SpatialFrame()

| Syntax | No. of bits | Mnemonic |
| --- | --- | --- |
| SpatialFrame() | | |
| { | | |
| FramingInfo(); | | |
| **bsIndependencyFlag**; | 1 | uimsbf |
| OttData(); | | |
| TttData(); | | |
| SmgData(); | | |
| TempShapeData(); | | |
| if (bsArbitraryDownmix != 0) { | | |
| ArbitraryDownmixData(); | | |
| } | | |
| ByteAlign(); | | |
| SpatialExtensionFrame(); | | |
| } | | |

FIG. 10

Table 6 – Syntax of SAOCExtensionConfigData(y)

| Syntax | No. of bits | Mnemonic |
|---|---|---|
| SAOCExtensionConfigData(y) | | |
| { | | |
| ObjectCoupledInformation(); | | |
| } | | |

FIG. 11

Table 7A – Syntax of ObjectCoupledInformation()

| Syntax | No. of bits | Mnemonic |
|---|---|---|
| ObjectInformation() { | | |
| for ( i=0; i<numObjects; i++ ) { | | |
| objectIsGrouped[i] = 0; | | |
| objectIsLeft[i] = 0; | | |
| objectIsMBO[i] = 0; | | |
| } | | |
| for ( i=0; i<numObjects; i++ ) { | | |
| for( j=0; j<numObjects; j++ ) { | | |
| bsCoupledObject[i][j] = 0; | | |
| } | | |
| } | | |
| for ( i=0; i<numObjects; i++ ) { | | |
| if ( objectIsGrouped[i] == 0 ) { | | |
| **bsCoupledObject[i][i];** | 1 | uimsbf |
| if (bsCoupledObject[i][i]) { | | |
| **bsObjectIsLeft;** | 1 | uimsbf |
| **bsObjectIsMBO;** | 1 | uimsbf |
| objectIsLeft[i] = bsObjectIsLeft; | | |
| objectIsMBO[i] = bsObjectIsMBO; | | |
| for (j=i+1; j<numObjects; j++) { | | |
| if ( objectIsGrouped[j] == 0 ) { | | |
| **bsCoupledObject[i][j];** | 1 | uimsbf |
| bsCoupledObject[j][i] = bsCoupledObject[i][j]; | | |
| if (bsCoupledObject[i][j] == 1 ) { | | |
| objectIsGrouped[i] = 1; | | |
| objectIsGrouped[j] = 1; | | |
| bsCoupledObject[j][j] = 1; | | |
| objectIsLeft[j] = bsObjectIsLeft; | | |
| objectIsMBO[j] = bsObjectIsMBO; | | |

FIG. 12

Table 7B –Syntax of ObjectCoupledInformation()

| Syntax | No. of bits | Mnemonic |
|---|---|---|
| ObjectInformation() | | |
| { | | |
| for ( i=0; i<numObjects; i++ ) { | | |
| **bsObjectType**; | 1 | **uimsbf** |
| if (bsObjectType == 1 ) { | | |
| **bsObjectIsLeft**; | 1 | **uimsbf** |
| **bsObjectIsMBO**; | 1 | **uimsbf** |
| **bsObjectIsCoupled**; | 5 | **uimsbf** |
| } | | |
| } | | |
| } | | |

Table 7B.2 –Syntax of ObjectCoupledInformation()

| Syntax | No. of bits | Mnemonic |
|---|---|---|
| ObjectInformation() | | |
| { | | |
| for ( i=0; i<numObjects; i++ ) { | | |
| **bsObjectType**; | 1 | **uimsbf** |
| if (bsObjectType == 1 ) { | | |
| **bsObjectIsLeft**; | 1 | **uimsbf** |
| **bsObjectIsMBO**; | **nBitsMBO** | NOTE |
| **bsObjectIsCoupled**; | 5 | **uimsbf** |
| } | | |
| } | | |
| } | | |

Note: nBitsMBO = ceil($\log_2$(bsNumObjects))

200

1st terminal
(300.1)
wire/wireless
communication
2nd terminal
(300.2)
server
(400)
wire/wireless
communication
1st terminal
(300.1)

FIG. 21
(A)
(B)

METHOD AND AN APPARATUS FOR PROCESSING AN AUDIO SIGNAL

CROSS-REFERENCE TO RELATED APPLICATION

The present application is a 37 C.F.R. §1.53(b) continuation of co-pending U.S. patent application Ser. No. 12/690,837 filed Jan. 20, 2010, which claims the benefit of U.S. Provisional Application Nos. 61/145,744 filed on Jan. 20, 2009; 61/145,749 filed on Jan. 20, 2009; 61/148,048 filed on Jan. 28, 2009; 61/148,387 filed on Jan. 29, 2009; 61/149,345 filed on Feb. 3, 2009, and Korean Patent application No. 10-2010-0004817 filed on Jan. 19, 2010, the entire contents of all which are hereby incorporated by reference.

BACKGROUND OF THE INVENTION

Field of the Invention

The present invention relates to an apparatus for processing an audio signal and method thereof. Although the present invention is suitable for a wide scope of applications, it is particularly suitable for encoding or decoding audio signals.

Discussion of the Related Art

Generally, in the process for downmixing a plurality of objects into a mono or stereo signal, parameters are extracted from the object signals, respectively. These parameters are usable for a decoder. And, panning and gain of each of the objects is controllable by a selection made by a user.

However, in order to control each object signal, each source contained in a downmix should be appropriately positioned or panned.

Moreover, in order to provide downlink compatibility according to a channel-oriented decoding scheme, an object parameter should be converted to a multi-channel parameter for upmixing.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which a mono signal, a stereo signal and a stereo signal can be outputted by controlling gain and panning of an object.

Another object of the present invention is to provide an apparatus for processing an audio signal and method thereof, by which spatial information for upmixing a channel-based object can be obtained from a bitstream as well as object information for controlling an object if object-based general objects and channel-based object (multichannel object or multichannel background object) are included in a downmix signal.

Another object of the present invention is to provide an apparatus for processing an audio signal and method thereof, which can identify which object is a multichannel object in a plurality of objects included in a downmix signal.

Another object of the present invention is to provide an apparatus for processing an audio signal and method thereof, which can identify which object is a left channel of a multichannel object if the multichannel object downmixed into stereo is included in a downmix signal.

A further object of the present invention is to provide an apparatus for processing an audio signal and method thereof, by which distortion of a sound quality can be prevented in case of adjusting a gain of a normal object such as a vocal signal or a gain of a multi-channel object such as a background music with a considerable width.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for processing an audio signal, comprising: receiving a downmix signal comprising at least one normal object signal, and bitstream including object information determined when the downmix signal is generated; extracting extension type identifier indicating whether the downmix signal further comprises a multi-channel object signal, from extension part of the bitstream; when the extension type identifier indicates that the downmix signal further comprise multi-channel object signal, extracting first spatial information from the bitstream; and, transmitting at least one of the first spatial information and the second spatial information; wherein the first spatial information is determined when a multi-channel source signal are downmixed into the multi-channel object signal, wherein the second information is generated using the object information and mix information is provided.

According to the present invention, the at least one of the first spatial information and the second spatial information is transmitted according to mode information indicating whether the multi-channel object signal is to be suppressed.

According to the present invention, the mode information indicates that the multi-channel object signal is not to be suppressed, the first spatial information is transmitted, when the mode information indicates that the multi-channel object signal is to be suppressed, the second spatial information is transmitted.

According to the present invention, the method further comprises when the first spatial information is transmitted, generating a multi-channel signal using the first spatial information and the multi-channel object signal.

According to the present invention, the method further comprises, when the second spatial information is generated, generating a output signal using the second spatial information and the normal object signal.

According to the present invention, the method further comprises when the second spatial information is transmitted, generating downmix processing information using the object information and the mix information; and, generating a processed downmix signal by processing the normal object signal using the downmix processing information.

According to the present invention, the first spatial information includes spatial configuration information and spatial frame data.

To further achieve these and other advantages and in accordance with the purpose of the present invention, An apparatus for processing an audio signal, comprising: a receiving unit receiving a downmix signal comprising at least one normal object signal, and bitstream including object information determined when the downmix signal is generated; an extension type identifier extracting part extracting extension type identifier indicating whether the downmix signal further comprises a multi-channel object signal, from extension part of the bitstream; a first spatial information extracting part, when the extension type identifier indicates that the downmix signal further comprise multi-channel object signal, extracting first spatial information from the bitstream; and, a multi-channel object transcoder transmitting at least one of the first spatial information and the second spatial information; wherein the first spatial information is determined when a multi-channel source signal are downmixed into the multi-channel object signal, wherein the second information is generated using the object information and mix information is provided.

According to the present invention, the at least one of the first spatial information and the second spatial information is transmitted according to mode information indicating whether the multi-channel object signal is to be suppressed.

According to the present invention, when the mode information indicates that the multi-channel object signal is not to be suppressed, the first spatial information is transmitted, when the mode information indicates that the multi-channel object signal is to be suppressed, the second spatial information is transmitted.

According to the present invention, the apparatus further comprises a multi-channel decoder, when the first spatial information is transmitted, generating a multi-channel signal using the first spatial information and the multi-channel object signal.

According to the present invention, the apparatus further comprises a multi-channel decoder, when the second spatial information is generated, generating a output signal using the second spatial information and the normal object signal.

According to the present invention, wherein the multi-channel object transcoder comprises: a information generating part, when the second spatial information is transmitted, generates downmix processing information using the object information and mix information; and, an downmix processing part generating a processed downmix signal by processing the normal object signal using the downmix processing information.

According to the present invention, wherein the first spatial information includes spatial configuration information and spatial frame data.

To further achieve these and other advantages and in accordance with the purpose of the present invention, a computer-readable medium having instructions stored thereon, which, when executed by a processor, causes the processor to perform operations, comprising: receiving a downmix signal comprising at least one normal object signal, and bitstream including object information determined when the downmix signal is generated; extracting extension type identifier indicating whether the downmix signal further comprises a multi-channel object signal, from extension part of the bitstream; when the extension type identifier indicates that the downmix signal further comprise multi-channel object signal, extracting first spatial information from the bitstream; and, transmitting at least one of the first spatial information and the second spatial information; wherein the first spatial information is determined when a multi-channel source signal are downmixed into the multi-channel object signal, wherein the second information is generated using the object information and mix information is provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a diagram for an example of a syntax of extension configuration;

FIG. 4 is a diagram for examples of a syntax of spatial configuration if an extension type identifier is x;

FIG. 5 is a diagram for an example of a syntax of spatial frame data if an extension type identifier is x;

FIG. 6 is a diagram for another example of a syntax of spatial frame data if an extension type identifier is x;

FIG. 7 is a diagram for an example of a syntax of spatial configuration information;

FIG. 8 is a diagram for an example of a syntax of spatial frame data;

FIG. 10 is a diagram for an example of a syntax of coupled object information if an extension type identifier is y;

FIG. 11 is a diagram for one example of a syntax of coupled object information;

FIG. 12 is a diagram for other examples of a syntax of coupled object information;

FIG. 21 is a diagram for relations of products each of which is provided with an audio signal processing apparatus according to one embodiment of the present invention.

DETAILED DESCRIPTION OF THE INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

The following terminologies in the present invention can be construed based on the following criteria and other terminologies failing to be explained can be construed according to the following purposes. First of all, it is understood that the concept 'coding' in the present invention can be construed as either encoding or decoding in case. Secondly, 'information' in this disclosure is the terminology that generally includes values, parameters, coefficients, elements and the like and its meaning can be construed as different occasionally, by which the present invention is non-limited.

Figure 1:
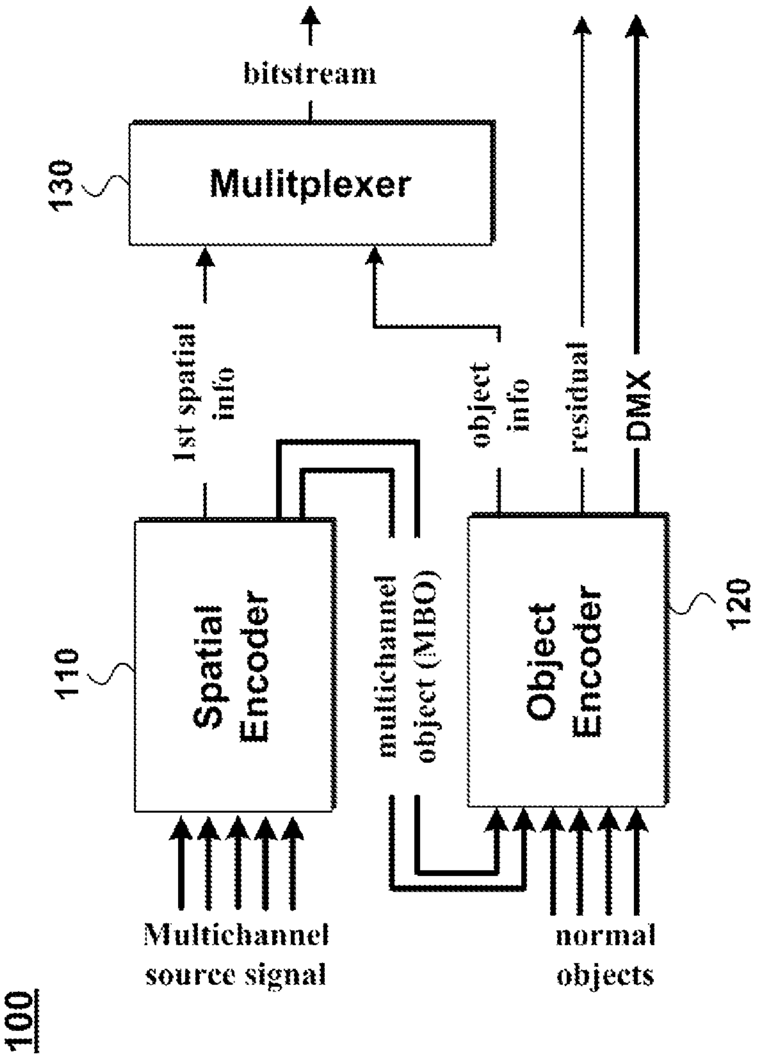
FIG. 1 is a block diagram of an encoder in an audio signal processing apparatus according to an embodiment of the present invention.

FIG. 1 is a block diagram for a diagram of an encoder in an audio signal processing apparatus according to one embodiment of the present invention.

Referring to FIG. 1, an encoder 100 includes a spatial encoder 110, an object encoder 120 and a multiplexer 130.

The spatial encoder 110 downmixes a multichannel source (or a multichannel sound source) by a channel based scheme to generate a down mixed multichannel object (or a multichannel background object) (hereinafter named a multichannel object (MBO), which is downmixed into a mono or stereo signal. In this case, the multichannel source signal is a sound configured with at least three channels. So to speak, the multichannel source signal can be generated from collecting one instrumental sound using a 5.1 channel microphone or obtaining a plurality of instrumental sounds and vocal sounds such as orchestra sounds using a 5.1 channel microphone. Of course, the multichannel source signal may correspond to a channel upmixed into 5.1 channel by variously processing a signal inputted through a mono or stereo microphone.

The aforesaid multichannel source signal can be named a multichannel object (MBO). And, an object signal generated from downmixing the multichannel source signal into a mono or stereo signal. Therefore, the present invention intends to follow the latter definition of the multichannel source signal.

The generated multichannel object (MBO) is inputted as an object to the object encoder 120. If the multichannel object (MBO) has a mono channel, it is inputted as one object. If the multichannel object has a stereo channel, the multichannel object (MBO) is inputted as a left multichannel object and a right multichannel object, i.e., two objects.

In this downmixing process, spatial information is extracted. The spatial information is the information for upmixing a downmix (DMX) into multi-channel and can include channel level information, channel correlation information, and the like. This spatial information shall be named a first spatial information to discriminate for a second spatial information generated from a latter decoder. The first spatial information is inputted to the multiplexer 130.

The object encoder 120 generates a downmix signal DMX by downmixing a multichannel object (MBO) and a normal object by an object based scheme. It may be able to further generate a residual as well as a downmix signal DMX by downmixing objects, which is non-limited by the present invention.

Object information is generated from this downmixing process. The object information (OI) is the information on objects included in the downmix signal and is also the information necessary to generate a plurality of object signals from the downmix signal DMX. The object information can include object level information, object correlation information and the like, which is non-limited by the present invention. Moreover, the object information can further include downmix gain information (DMG) and downmix channel level difference (DCLD). The downmix gain information (DMG) indicates a gain applied to each object before downmixing. And, the downmix channel level difference (DCLD) indicates a ratio of applying each object to a left channel and a right channel if a downmix signal is stereo. In this case, the generated object information is inputted to the multiplexer 130.

Meanwhile, the object encoder 120 further generates stereo object information and is then able to deliver it to the multiplexer 130. In this case, a stereo object means an object signal enabling at least one or two sound sourced to be inputted to a stereo microphone.

Although FIG. 1 shows that the spatial encoder 110 and the object encoder 120 are separated from each other, it is able to configure the object encoder 120 to include functionality of the spatial encoder 110. Therefore, the object encoder 120 is able to generate spatial information and object information by downmixing a multichannel sound source and a normal object.

The multiplexer 130 generates a bitstream using the object information generated by the object encoder 120. If a multichannel object (MBO) exists in the downmix signal DMX, the multiplexer 130 enables the first spatial information generated by the spatial encoder 110 to be included in the bitstream as well as the object information by multiplexing.

For this, there are two kinds of multiplexing schemes. According to a first multiplexing scheme, a syntax corresponding to an object information bitstream is defined as including a first spatial information. According to a second multiplexing scheme, transport mechanism of a object information bitstream and a spatial information bitstream is newly provided.

The first scheme will be explained in detail with reference to FIGS. 3 to 8 later.

Meanwhile, the multiplexer 130 generates a coupled object information and then enables the generated coupled object information to be included in a bitstream. In this case, the coupled object information is the information indicating whether a stereo object or a multichannel object exists in at least two object signals downmixed by the object encoder 120 or whether a normal object exists in at least two object signals downmixed by the object encoder 120 only. If the first spatial information exists, the multichannel object exists. As mentioned in the foregoing description, if the stereo object information is received from the object encoder 120, the stereo object exists. If the multichannel object or the stereo object is included, the coupled object information is able to further include the information indicating which object is a left or right object of the stereo object (or the multichannel object). This will be explained in detail with reference to FIGS. 10 to 12 later.

Figure 2:
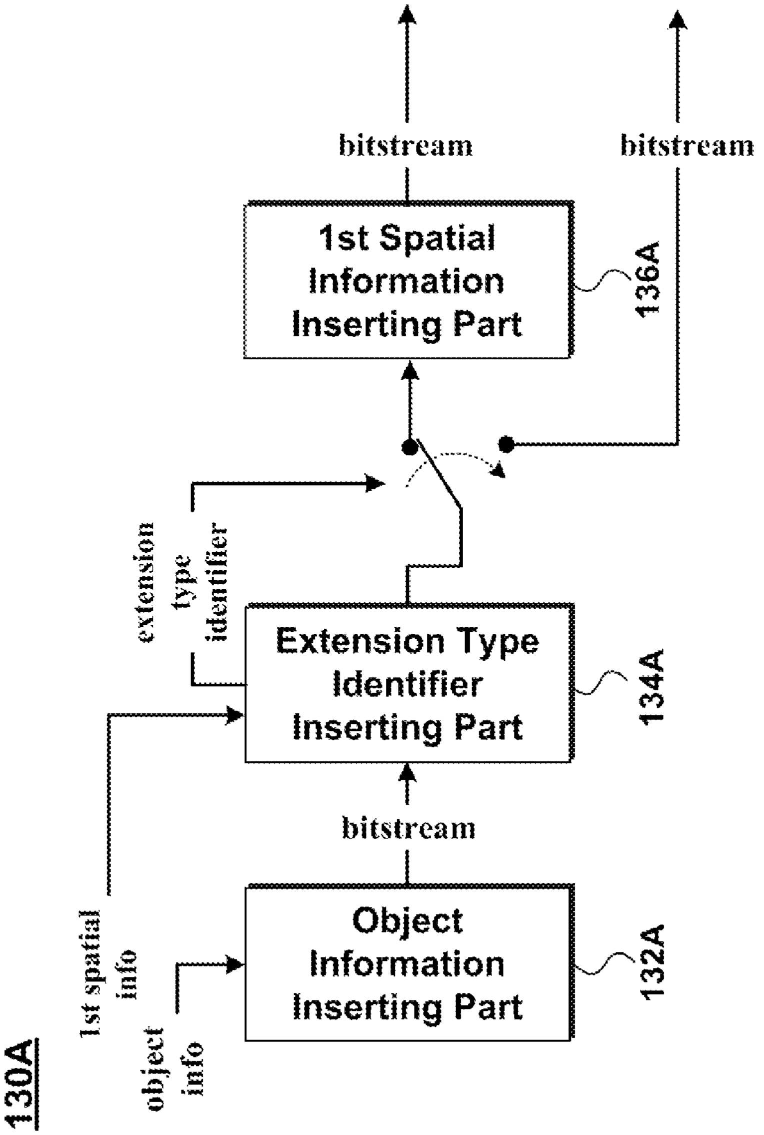
FIG. 2 is a detailed block diagram for an example of a multiplexer 130 shown in FIG. 1.

FIG. 2 is a detailed block diagram for an example of the multiplexer 130 shown in FIG. 1. Referring to FIG. 2, the multiplexer 130 includes an object information inserting part 132, an extension type identifier inserting part 134 and a first spatial information inserting part 136.

The object information inserting part 132 inserts the object information received from the object encoder 120 in a bitstream according to a syntax. The extension type identifier inserting part 134 determines an extension type identifier according to whether the first spatial information is received from the spatial encoder 110 and then inserts the extension type identifier in the bitstream.

FIG. 3 is a diagram for an example of a syntax (SAOCExtensionConfig( )) of extension configuration. Referring to a row (A) of FIG. 3, it can be observed that an extension type identifier (bsSaocExtType) indicating a type of an extension region is included. In this case, the extension type identifier is the identifier indicating what kind of type of information is included in the extension region. Particularly, the extension type identifier indicates whether spatial information exists in a bitstream. Meanwhile, since the existence of the spatial information may mean that a multichannel object (MBO) is included in a downmix signal, the extension type identifier can indicate whether a multichannel object (MBO) is included in a downmix signal as well. One example of an extension type identifier (bsSaocExtType) and its meaning is shown in Table 1.

TABLE 1

[One example of the meaning of an extension type identifier]

| extension type identifier (bsSaocExtType) | Meaning | Extension frame data |
|---|---|---|
| 0 | Residual coding data | Exist |
| 1 | Preset information | Exist |
| x | MBO spatial information | Exist |
| i | Metadata | Not exist |

In Table 1, 'x' and T are arbitrary integers, respectively.

Referring to Table 1, if an extension type identifier is x (where x is an arbitrary integer, and preferably, an integer equal to or smaller than 15), it means that MBO spatial information exists. If the MBO spatial information exists, it means that extension frame data is further included.

If the extension type identifier (bsSaocExtType) is x, referring to a row (B) of FIG. 3, extension configuration data (SAOCExtensionConfigData (x)) corresponding to the x is paged. This will be explained with reference to FIG. 4 as follows.

FIG. 4 is a diagram for examples of a syntax of spatial configuration if an extension type identifier is x, FIG. 5 is a diagram for an example of a syntax of spatial frame data if an extension type identifier is x, and FIG. 6 is a diagram for another example of a syntax of spatial frame data if an extension type identifier is x.

Referring to Table 2A of FIG. 4, extension configuration data (SAOCExtensionConfigData (x)) includes MBO identification information (bsMBOIs) and spatial configuration information (SpatialSpecificConfig( )).

The MBO identification information is the information indicating which object is MBO. If the MBO identification information is set to 0, $1^{st}$ object corresponds to MBO. If the MBO identification information is set to 4, $5^{th}$ object corresponds to MBO. It may happen that the MBO is stereo (i.e., two MBOs). Whether the MBO is stereo can be observed based on the spatial configuration information (SpatialSpecificConfig( )). Therefore, if the MBO is stereo, it can be promised that the object specified by the MBO identification information is MBO and that a next object is MBO as well. For instance, if the MBO identification information is set to 0 and two MBOs exist according to the spatial configuration information, $1^{st}$ and $2^{nd}$ objects can correspond to MBO.

Referring to Table 2B of FIG. 4, it can be observed that MBO identification information (bsMBOIs) is included not as fixed bits but as variable bits (nBitsMBO). As mentioned in the foregoing description, since the MBO identification information is the information indicating which one of objects included in a downmix signal is MBO, bits exceeding the total number of the objects included in the downmix signal are not necessary. Namely, if the total number of objects is 10, the bit number indicating 0~9 (e.g., 4 bits) is necessary only. If the total number of objects is N, ceil ($\log_2 N$) bits are necessary only. Therefore, it is able to reduce the bit number by transmission with variable bits according to the total object number rather than transmission with fixed bits (5 bits).

Referring to Table 2C of FIG. 4, like the former example, MBO identification information and spatial configuration information (SpatialSpecificConfig( )) are included. If a frame is included in a header, spatial frame data (SpatialFrame( )) is included.

FIG. 5 and FIG. 6 show examples for syntax of spatial frame data (SpatialFrame( )) if an extension type identifier is x. Referring to Table 3A of FIG. 5, if an extension type identifier is x, it can be observed that extension frame data (SAOCExtensionFrame(x)) includes spatial frame data (SpatialFrame( )). Syntax shown in FIG. 6 can be defined instead of the syntax shown in FIG. 5.

Referring to Table 3B.1 of FIG. 6, if an extension type identifier is x, extension frame data (SAOCExtensionFrame (x)) includes MBO frame (MBOFrame( )). The MBO frame (MBOFrame( )), as shown in Table 3B.2, includes spatial frame data (SpatialFrame( )).

FIG. 7 is a diagram for an example of a syntax of spatial configuration information, and FIG. 8 is a diagram for an example of a syntax of spatial frame data.

Referring to FIG. 7, detailed configuration of the spatial configuration information (SpatialSpecificConfig( )) included in Tables 2A to 2C shown in FIG. 4 is illustrated. The spatial configuration information includes configuration information required for upmixing a mono or stereo channel into plural channels. In the spatial configuration information, sampling frequency index (bsSamplingFrequencyIndex) indicating a preferential sampling frequency, frame length information (bsFrameLength) indicating a length of frame (i.e., the number of time slots), tree configuration information (bsTreeConfig) indicating one of predetermined tree structures ($5\text{-}1\text{-}5_1$ tree config., 5-2-5 tree config., 7-2-7 tree config., etc.) and the like are included. Through the tree configuration information, it is able to recognize whether MBO is mono or stereo.

Referring to FIG. 8, detailed configuration of the spatial configuration data (SpatialFrame( )) included in Table 2C of FIG. 4, FIG. 5 and Table 3B.2 of FIG. 5 is illustrated. The spatial frame data includes such a spatial parameter as a channel level difference (CLD) required for upmixing a mono or stereo channel into plural channels. In particular, frame information (Frameinfo( )), OTT information (OttData( )) and the like are included in the spatial frame data. The frame information (Frameinfo( )) can include information indicating the number of parameter sets and information indicating that a parameter set is applied to which time slot. The OTT information can include such a parameter as a channel level difference (CLD) required for OTT (one-to-two) box, channel correlation information (ICC) and the like.

In brief, the multiplexer 120 shown in FIG. 2 determines the extension frame type indicating a presence or non-presence of MBO according to whether the first spatial information exists. If the extension frame type indicates that the first spatial information exists, the first spatial information is included in the bitstream. The syntax for having the first spatial information included in the bitstream can be defined as shown in one of FIGS. 3 to 8.

Figure 9:
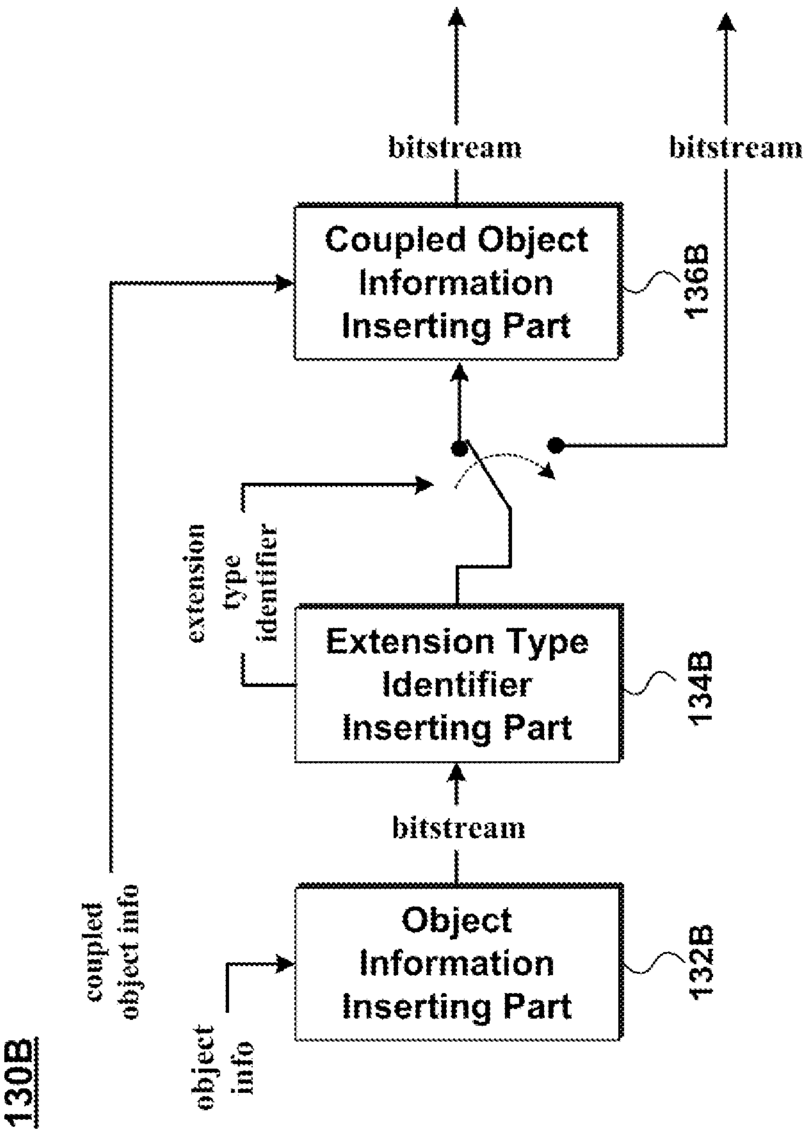
FIG. 9 is a detailed block diagram for another example of a multiplexer 130 shown in FIG. 1.

FIG. 9 is a detailed block diagram for another example of the multiplexer 130 shown in FIG. 1. In the example (130A) shown in FIG. 2, if an extension type identifier is x (i.e., MBO is included), the first spatial information is included in the bitstream. Yet, in another example (130B) shown in FIG. 9, if an extension type identifier is y, coupled object information (ObjectCoupledInformation( )) is included in a bitstream. In this case, the coupled object information is the information indicating whether a stereo object or a multichannel object exists in at least two object signals downmixed by the object encoder 120 or whether a normal object exists only in at least two object signals downmixed by the object encoder 120.

Referring to FIG. 9, a multiplexer 103B includes an object information inserting part 132B, an extension type identifier inserting part 134B and a coupled object information inserting part 136B. In this case, the object information inserting part 132B performs the same functionality of the element 132A having the same name shown in FIG. 2, of which details are omitted from the following description.

The extension type identifier inserting part 134B determines an extension type identifier according to whether a stereo object or a multichannel object (MBO) exists in a downmix DMX and then has the determined extension type identifier inserted in a bitstream. Subsequently, if the extension type identifier means that the stereo object or the multichannel object exists (e.g., if it is y), coupled object information is included in the bitstream. In this case, the extension type identifier (bsSaocExtType) can be included in the former extension configuration shown in FIG. 3. The extension type identifier (bsSaocExtType) and examples of its meanings are shown in the following table.

TABLE 2

[Example for meaning of extension type identifier]

| extension type identifier (bsSaocExtType) | Meaning | Extension frame data |
|---|---|---|
| 0 | Residual coding data | Exist |
| 1 | Preset information | Exist |
| x | MBO spatial information | Exist |
| y | Coupled object information | Not exist |

In Table 2, 'y' is an arbitrary integer.

Table 2 indicates that coupled object information is included in a bitstream if an extension type identifier is y. Of course, the aforesaid Table 1 and the Table 1 can be combined together.

FIG. 10 is a diagram for an example of a syntax of coupled object information if an extension type identifier is y. FIG. 11 is a diagram for one example of a syntax of coupled object information. And, FIG. 12 is a diagram for other examples of a syntax of coupled object information.

Referring to FIG. 10, if an extension type identifier is y (i.e., if bsSaocExtType is y), it can be observed that coupled object information (ObjectCoupledInformation( )) is included in extension configuration data (SAOCExtensionConfigData(y)).

Referring to FIG. 11, coupled object information (ObjectCoupledInformation( )) includes preferential coupled object identification information (bsCoupledObject[i][j]), left channel information (bsObjectIsLeft), MBO information (bsObjectIsMBO) and the like.

The coupled object identification information (bsCoupledObject[i][j]) is the information indicating which object is a part of a stereo or multichannel object. In particular, if the coupled object identification information (bsCoupledObject [i][j]) is set to 1, it means that $i^{th}$ and $j^{th}$ objects are coupled with each other. If the coupled object identification information (bsCoupledObject[i][j]) is set to 0, it means that $i^{th}$ and $j^{th}$ have nothing to do with each other. When there are total 5 objects, if $3^{rd}$ and $4^{th}$ objects are coupled with each other, one corresponding example of the coupled object identification information (bsCoupledObject[i][j]) is shown in the following table.

TABLE 3

[Example of coupled object identification information (bsCoupledObject[i][j])]

| bsCoupledObject[i][j] | i = 0 | i = 1 | i = 2 | i = 3 | i = 4 |
|---|---|---|---|---|---|
| i = 0 | 1 | 0 | 0 | 0 | 0 |
| j = 1 | 0 | 1 | 1 | 0 | 0 |
| j = 2 | 0 | 1 | 1 | 0 | 0 |
| j = 3 | 0 | 0 | 0 | 1 | 0 |
| j = 4 | 0 | 0 | 0 | 0 | 1 |

In Table 3, there are total 5 objects. And, 3$^{rd}$ and $4^{th}$ objects are coupled with each other. Moreover, only if coupled objects exist [if (bsCoupledObject[i][j])], left channel information (bsObjectIsLeft) and MBO information (bsObjectIsMBO) are included. If the left channel information (bsObjectIsLeft) is set to 1, it means that a corresponding object corresponds to a left channel of a stereo object. If the left channel information (bsObjectIsLeft) is set to 0, it means that a corresponding object corresponds to a right channel of a stereo object. If the MBO information (bsObjectIsMBO) is set to 1, it means that a corresponding object is generated from a multichannel object (MBO). If the MBO information (bsObjectIsMBO) is set to 0, it means that a corresponding object is not a multichannel object. In the former example described with reference to FIG. 2, a presence of MBO can be obtained according to whether the first spatial information is included. Yet, in the present example, it is able to know whether a multichannel object is included in an object through the MBO information.

Referring to FIG. 12, another example of coupled object information is illustrated. This example of the coupled object information includes object type information (bsObjectType), left channel information (bsObjectIsLeft), MBO information (bsObjectIsMBO), coupled target information (bsObjectIsCoupled) and the like.

In this case, the object type information (bsObjectType) is set to 1 for each object, it indicates a corresponding object is a stereo object. If the object type information (bsObjectType) is set to 0, it indicates a corresponding object is a normal object.

When there are total 5 objects, if $3^{rd}$ and $4^{th}$ objects are stereo objects (or multichannel objects) and $1^{st}$, $2^{nd}$ and $5^{th}$ objects are normal objects, object type information can be represented as follows.

TABLE 4

[One example of object type information (bsObjectType)]

| | i = 0 | i = 1 | i = 2 | i = 3 | i = 4 |
|---|---|---|---|---|---|
| bsObjectType | 0 | 0 | 1 | 1 | 0 |

When there are total 5 objects, if 1st to 4th objects are stereo objects (or multichannel objects) and 5th object is a normal object only, object type information can be represented as follows.

TABLE 5

[Another example of object type information (bsObjectType)]

| | i = 0 | i = 1 | i = 2 | i = 3 | i = 4 |
|---|---|---|---|---|---|
| bsObjectType | 1 | 1 | 1 | 1 | 0 |

Only if object type information is set to 1 [if (bsObjectType==1)], left channel information (bsObjectIsLeft) and MBO information (bsObjectIsMBO) are included. Meanwhile, the coupled target information (bsObjectIsCoupled) is the information indicating what kind of an object is a target for a pair or couple if a corresponding object is stereo. When the coupled target information, as shown in Table 7B.1 of FIG. 12, is represented as fixed bits (5 bits), in case of the former Table 4, the coupled target information can be represented as Table 6. In case of Table 5, the coupled target information can be represented as Table 7.

TABLE 6

[One example of coupled target information (bsObjectIsCoupled)]

| | i = 0 | i = 1 | i = 2 | i = 3 | i = 4 |
|---|---|---|---|---|---|
| bsObjectType | — | — | 00011 | 00010 | — |

TABLE 7

[Another example of coupled target information (bsObjectIsCoupled)]

| | i = 0 | i = 1 | i = 2 | i = 3 | i = 4 |
|---|---|---|---|---|---|
| bsObjectIsCoupled | 00001 | 00000 | 00011 | 00010 | — |

First of all, it can be observed that coupled target information is not transmitted for a normal object.

According to the case shown in Table 6, since coupled target information of 3rd object (i=2) is 'i=3(00011)', 4th object (i=3) is designated as a target. And, the 4th object is set to 'i=2(00010)' and designates the 3rd object (i=2) as a target. Therefore, the 3rd and 4th objects construct one pair.

According to the case shown in Table 7, it can be observed that 1St and 2nd objects construct one pair. And, it can be observed that 3rd and 4th objects construct different couples, respectively.

Meanwhile, the coupled target information (bsObjectIsCoupled) can be represented as the fixed bits shown in Table 2B.1 of FIG. 12. Yet, in order to further save the bit number, the coupled target information (bsObjectIsCoupled) can be represented as variable bits shown in Table 7B.2. This has the same reasons and principles for representing the MBO identification information (MBOIs) as variable bits, which are described with reference to FIG. 4 in the foregoing description.

$$nBitsMBO=\mathrm{ceil}(\log_2(bs\mathrm{NumObjects}))\qquad\text{[Formula 1]}$$

In Formula 1, bsNumObjects is the total number of objects and ceil(x) is an integer not greater than x.

In the former cases shown in Table 4 and Table 5, the total object number is 5. Hence, they can be represented as Table 8 and Table 9 using variable bits (3 bits=ceil ($\log_2 5$)) instead of the 5 fixed bits.

TABLE 8

[One example of coupled target information (bsObjectIsCoupled)]

| | i = 0 | i = 1 | i = 2 | i = 3 | i = 4 |
|---|---|---|---|---|---|
| bsObjectType | — | — | 011 | 010 | — |

TABLE 9

[Another example of coupled target information (bsObjectIsCoupled)]

| | i = 0 | i = 1 | i = 2 | i = 3 | i = 4 |
|---|---|---|---|---|---|
| bsObjectIsCoupled | 001 | 000 | 011 | 010 | — |

Figure 13:
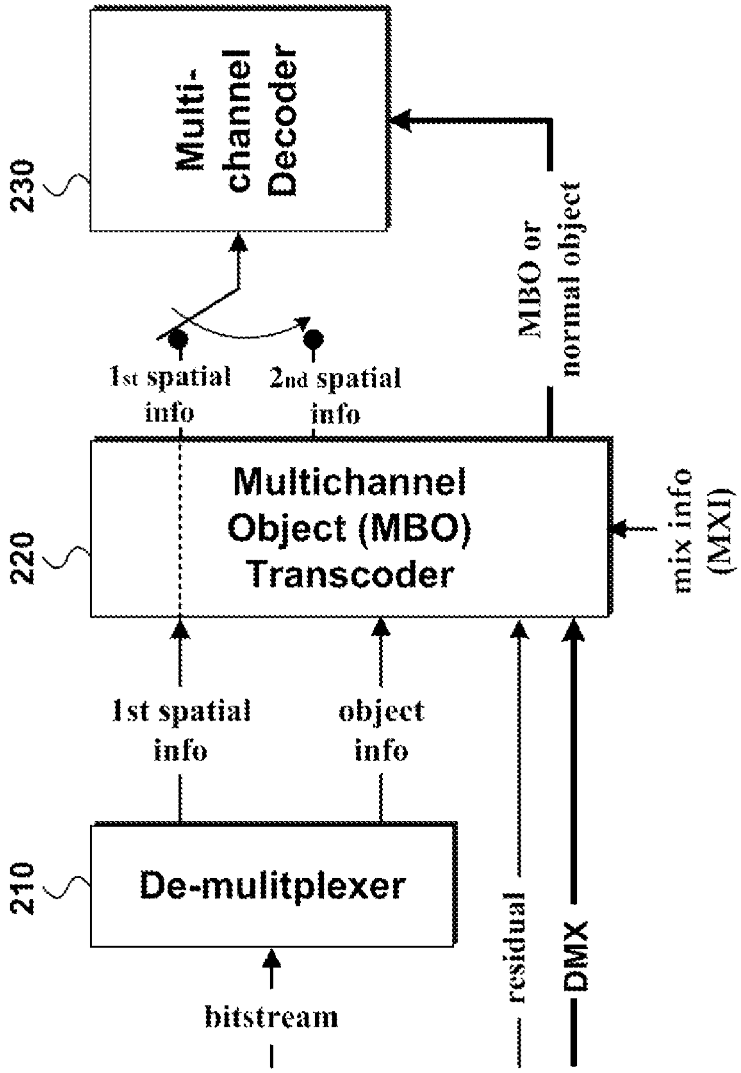
FIG. 13 is a block diagram of a decoder in an audio signal processing apparatus according to an embodiment of the present invention.
Figure 14:
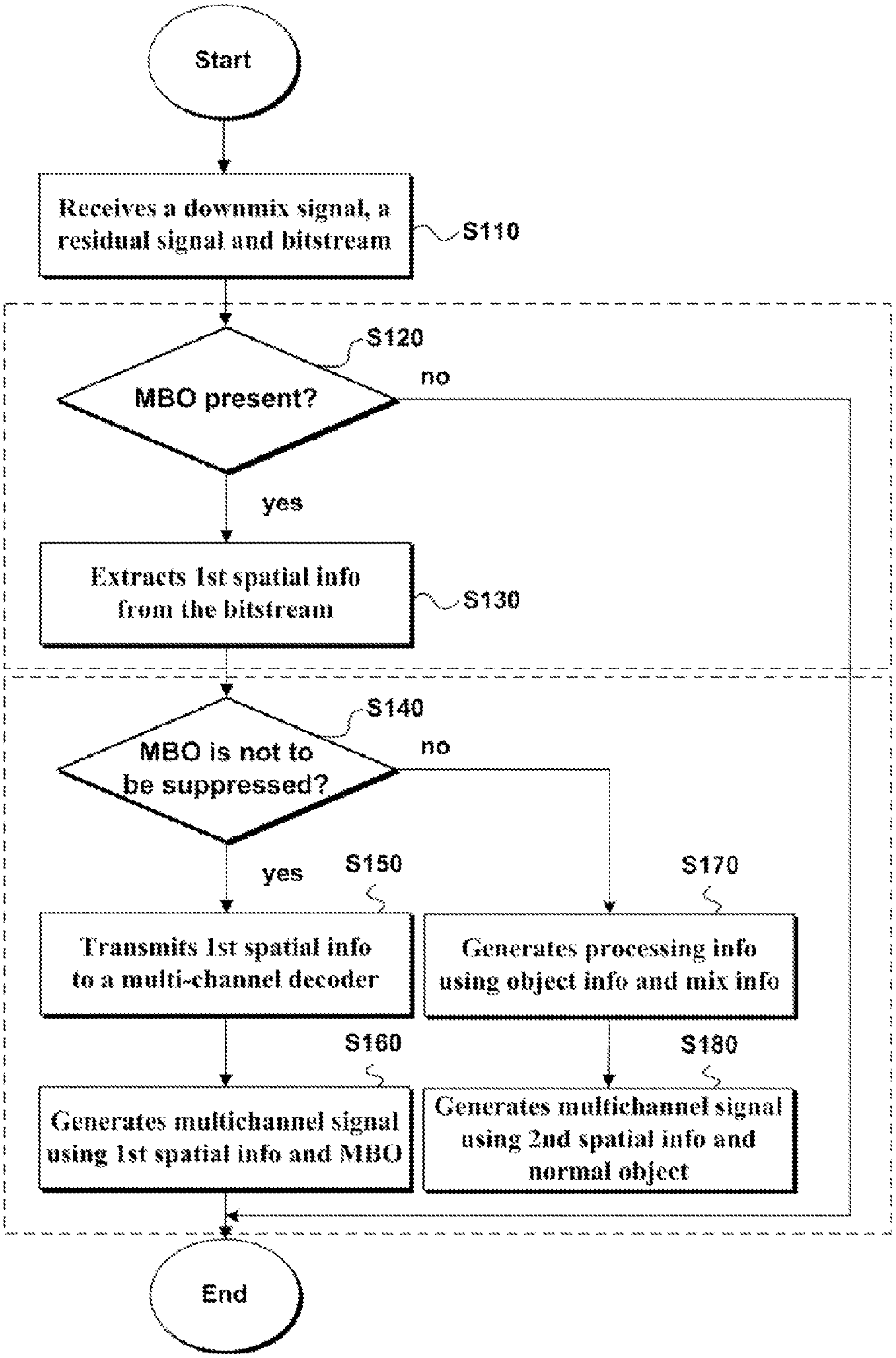
FIG. 14 is a flowchart for a decoding operation in an audio signal processing method according to an embodiment of the present invention.

FIG. 13 is a block diagram of a decoder in an audio signal processing apparatus according to an embodiment of the present invention. And, FIG. 14 is a flowchart for a decoding operation in an audio signal processing method according to an embodiment of the present invention.

Referring to FIG. 13, a decoder 200 includes a demultiplexer 210 and an MBO transcoder 220 and is able to further include a multichannel decoder 230. Functions and operations of the decoder 200 are explained with reference to FIG. 13 and FIG. 14 as follows.

First of all, a receiving unit (not shown in the drawings) of the decoder 210 receives a downmix signal DMX and a bitstream and is able to further receive a residual signal [step S110]. In this case, the residual signal can be included in the bitstream and the downmix signal DMX can be further included in the bitstream, by which the present invention is non-limited.

The demultiplexer 210 extracts an extension type identifier from the bitstream (more particularly, from an extension region of the bitstream) and then determines whether a multichannel object (MBO) is included in the downmix signal DMX based on the extracted extension type identifier. In case of determining that the MBO is included in the downmix signal DMX ['yes' in the step S120], the demultiplexer 210 extracts a first spatial information from the bitstream [S130].

The MBO transcoder 220 separates the downmix DMX into an MBO and a normal object using a residual, object information and the like. The MBO transcoder 220 determines a mode based on mix information MXI. In this case, the mode can be classified into a mode for upmixing (or boosting) the MBO or a mode for controlling the normal object. Since the mode for upmixing the MBO enables a background to remain only, it may correspond to a karaoke mode. Since the mode for controlling the normal object enables such an object as a vocal to remain by eliminating or suppressing the background, it may correspond to a solo mode. Meanwhile, the mix information MXI shall be explained in detail with reference to FIG. 17 and FIG. 18 later.

Thus, in case of a mode for non-suppressing the MBO (or a mode for upmixing or boosting the MBO) (e.g., a karaoke mode) ['yes' in the step S140], the received first spatial information is delivered to the multichannel decoder 230 [step S150]. If so, the multichannel decoder 230 generates a multichannel signal by upmixing a multichannel object of a mono or stereo channel using the first spatial information by a channel based scheme [step S160].

In case of a mode for suppressing the MBO (i.e., a case of rendering or boosting the normal object) (e.g., a solo mode) ['yes' in the step S140], processing information is generated not using the received first spatial information but using the object information and the mix information MXI [step S170]. The object information is the information determined when at least one object signal included in the downmix is downmixed. As mentioned in the foregoing description, the object information includes object level information and the like. In this case, the processing information includes at least one of downmix processing information and second spatial information. In case of a mode for generating an output channel from the MBO transcoder 220 without the multichannel decoder 230 (decoding mode), the processing information includes the downmix processing information only. On the contrary, in case that the normal object is delivered to the multichannel decoder 230 (transcoding mode), the processing information can further include the second spatial information. The decoding mode and the transcoding mode shall be explained in detail with reference to FIG. 17 and FIG. 18 later.

Thus, if the MBO transcoder 220 generates the second spatial information (decoding mode), the multichannel decoder 230 generates a multichannel signal by upmixing the normal object using the second spatial information [step S180].

In the following description, detailed configuration of the demultiplexer 210 is explained with reference to FIG. 15 and FIG. 17. And, detailed configuration of the MBO transcoder 220 is explained with reference to FIG. 17 and FIG. 18.

Figure 15:
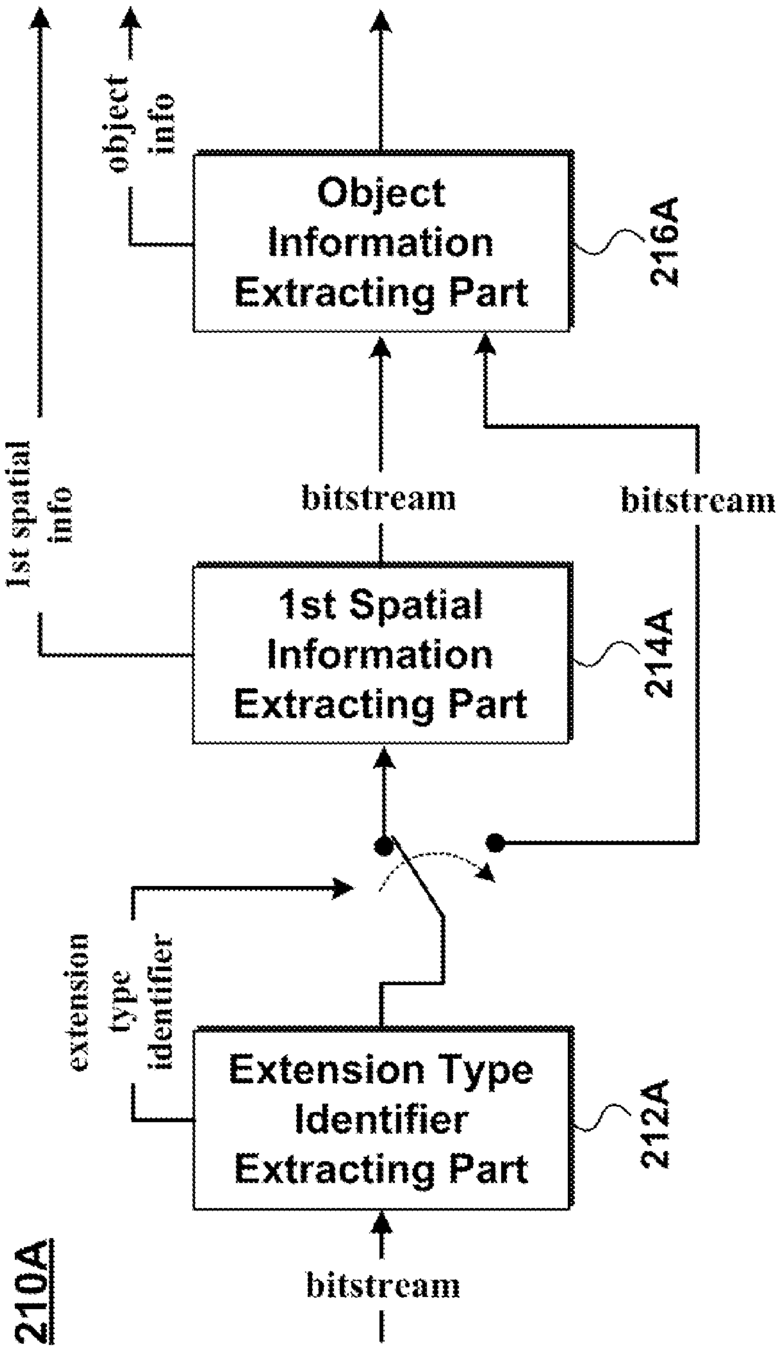
FIG. 15 is a detailed block diagram for one example of a demultiplexer 210 shown in FIG. 13.
Figure 16:
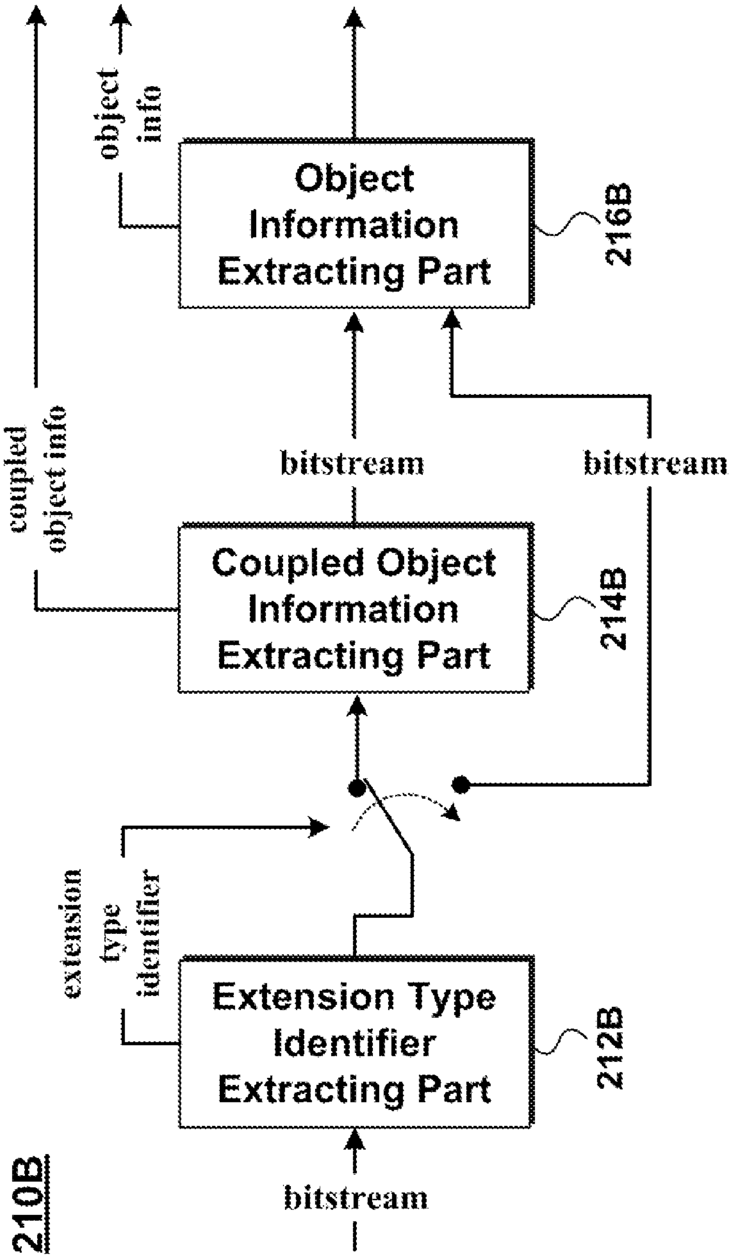
FIG. 16 is a detailed block diagram for another example of a demultiplexer 210 shown in FIG. 13.

FIG. 15 is a detailed block diagram for one example of the demultiplexer 210 shown in FIG. 13, and FIG. 16 is a detailed block diagram for another example of the demultiplexer 210 shown in FIG. 13. In particular, a demultiplexer 210A shown in FIG. 15 is an example corresponding to the former multiplexer 130A shown in FIG. 2. And, a demultiplexer 210B shown in FIG. 16 is an example corresponding to the former multiplexer 130B shown in FIG. 9. In brief, the demultiplexer 210A shown in FIG. 15 is an example for extracting a first spatial information according to an extension type identifier, while the demultiplexer 210B shown in FIG. 16 is an example for extracting a coupled object information.

Referring to FIG. 15, the demultiplexer 210A includes an extension type identifier extracting part 212A, a first spatial information extracting part 214A and an object information extracting part 216A. First of all, the extension type identifier extracting part 212A extracts an extension type identifier from a bitstream. In this case, the extension type identifier (bsSaocExtType) can be obtained according to the syntax shown in FIG. 3 and can be interpreted by Table 1 explained in the foregoing description. In case that the extension type identifier indicates that MBO is included in a downmix signal (i.e., spatial information is included in a bitstream) (e.g., if the (bsSaocExtType) is x), the bitstream is introduced into the first spatial information extracting part 214A. The first spatial information extracting part 214A is then able to obtain the first spatial information from the bitstream. On the contrary, if the extension type identifier indicates that the MBO is not included in the downmix, the bitstream is not introduced into the first spatial information extracting part 214A but is directly delivered to the object information extracting part 216A.

As mentioned in the foregoing description, the first spatial information is the information determined in case of downmixing a multichannel source signal into a mono or stereo MBO. And the first spatial information is the spatial information necessary to upmix an MBO into multichannel. Moreover, the first spatial information can include the spatial configuration information defined in FIG. 4 or FIG. 7 and the spatial frame data shown in FIG. 5, FIG. 6 or FIG. 8.

And, the object information extracting part 216A extracts the object information from the bitstream irrespective of the extension type identifier.

Referring to FIG. 16, the demultiplexer 210B includes an extension type identifier extracting part 212B, a coupled object information extracting part 214B and an object information extracting part 216B.

First of all, the extension type identifier extracting part 212B extracts an extension type identifier from a bitstream. The extension type identifier can be obtained according to the syntax shown in FIG. 3 and can be interpreted by Table 2 explained in the foregoing description. In case that the extension type identifier indicates that coupled object information is included in the bitstream (e.g., if bsSaocExtType=y), the bitstream is introduced into the coupled object information extracting part 214B. Otherwise, the bitstream is directly delivered to the object information extracting part 216B.

In this case, the coupled object information is the information indicating whether a stereo object or a multichannel object exists in at least two downmixed object signals or whether a normal object exists in at least two downmixed object signals. Moreover, as mentioned in the foregoing description with reference to FIG. 10 and FIG. 11, the coupled object information can include coupled object identification information (bsCoupledObject[i][j]), left channel information (bsObjectIsLeft), MBO information (bsObjectIsMBO) and the like. In particular, the coupled object information is the information indicating whether a stereo object or a multichannel object exists in at least two object signals downmixed by the object encoder 120 or whether a normal object exists in at least two object signals downmixed by the object encoder 120 only. A decoder is able to know which object is a stereo object (or a multichannel object) using the coupled object information. In the following description, attributes and usages of the coupled object information are explained.

First of all, even if a stereo object (or a multichannel signal downmixed into stereo) includes two object signals, it has properties of left and right channels of at least one or more sound sources. Therefore, high similarity exists between the left and right channels. Namely, left and right channels of an object act like one object. For instance, inter-object cross correlation (IOC) may be very high. So, if a decoder is aware which one of plural objects included in a downmix signal corresponds to a stereo object (or a multichannel object), it is able to raise efficiency in rendering an object using the above-mentioned similarity of the stereo object. For instance, in case of controlling a level or panning (position) of a specific object, it is able to separately control left and right channels of a stereo object handled as two objects. In particular, a user is able to render a left channel of a stereo object in to left and right channels of an output channel with a maximum level and is also able to render a right channel of the stereo object into left and right channels of an output channel with a minimum level. Thus, in case of rendering an object by ignoring properties of the stereo object, a sound quality may be considerably degraded. Yet, if a decoder is aware of a presence of a stereo object, it is able to prevent the degradation of a sound quality by collectively controlling both of the left and right channels of the stereo. The decoder may be able to estimate which object is a partial channel of the stereo object using an IOC value. Yet, if the coupled object information explicitly indicating which object is the stereo object is received, the decoder is able to utilize the received coupled object information in rendering an object.

Meanwhile, if a downmix signal includes a stereo channel object, a decoder is able to know whether the object is a normal stereo object or an object generated from downmixing a multichannel object (MBO) into a stereo channel using the above-mentioned MBO information. The decoder is also able to be aware whether spatial information (this may correspond to the first spatial information described with reference to FIG. 15) determined in downmixing a multichannel object (MBO) is included in a bitstream, using the MBO information. Moreover, when the MBO is utilized in the decoder, or at best, just to be modified in its overall gain.

Thus, the demultiplexer 210B shown in FIG. 16 receives the coupled object information. If the extension type identifier indicates that the coupled object information is included, the demultiplexer 210B extracts the coupled object information from the bitstream.

And, the object information extracting part 216B extracts the object information from the bitstream irrespective of a presence or non-presence of the extension type identifier or the coupled object information.

Figure 17:
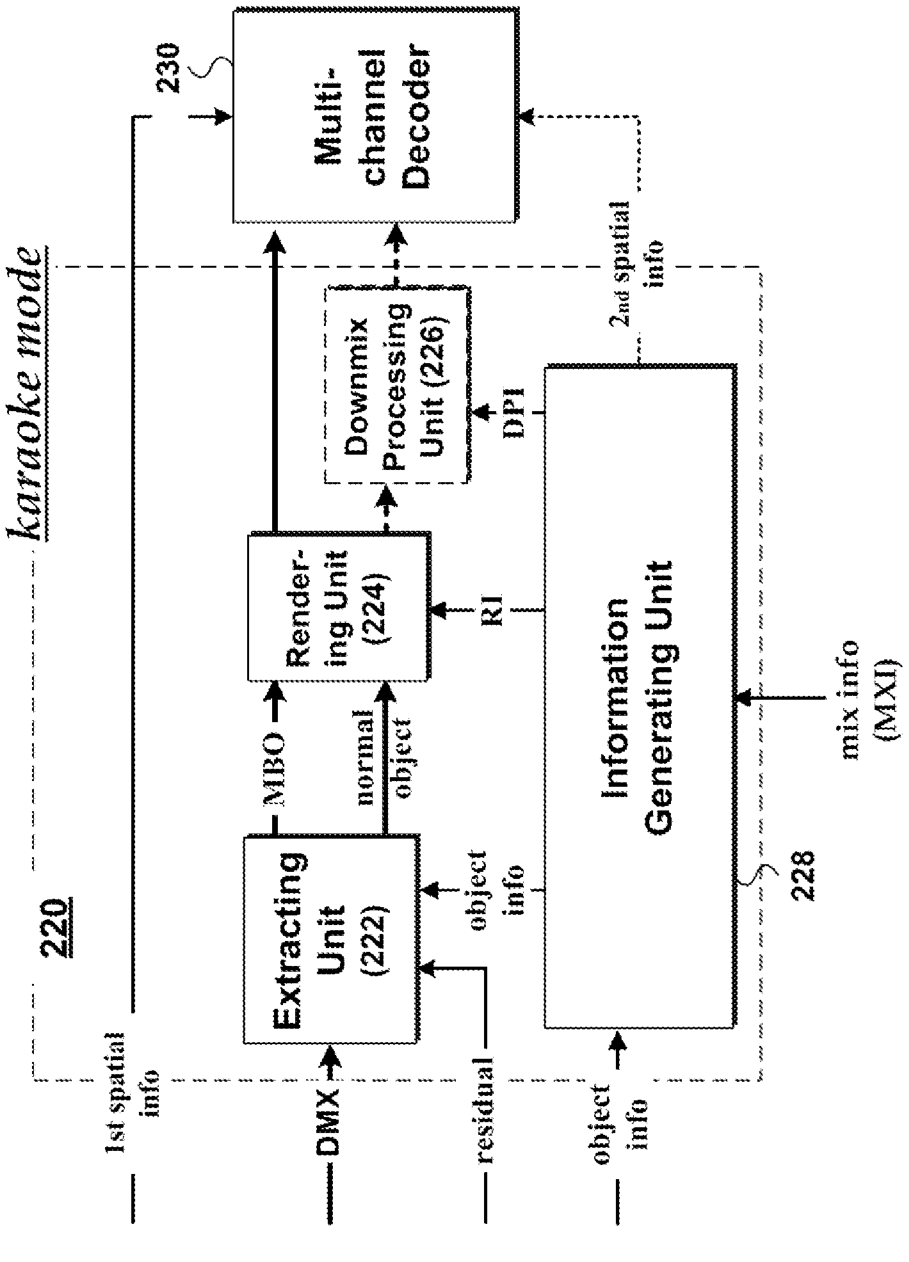
FIG. 17 is a detailed block diagram for one example of an MBO transcoder 220 shown in FIG. 13.
Figure 18:
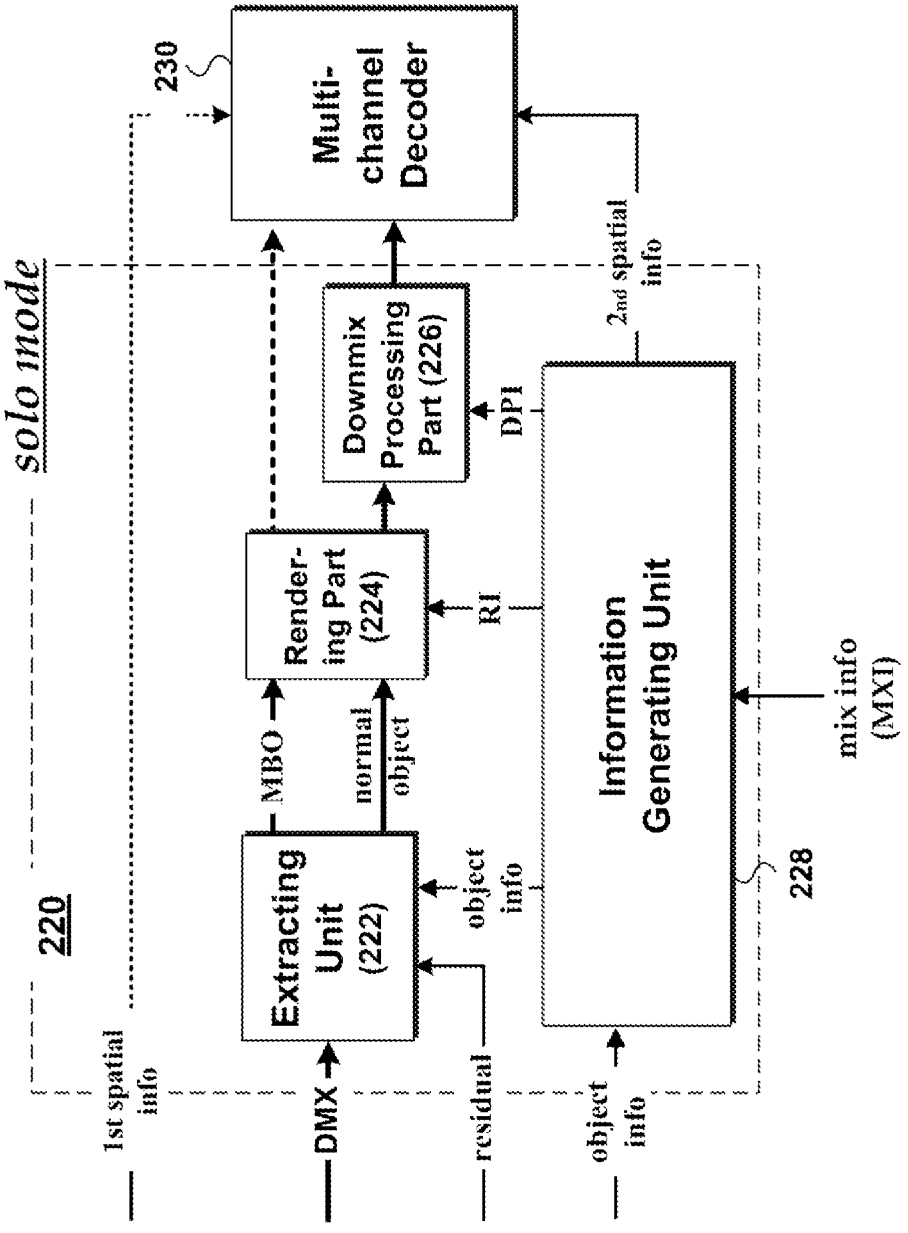
FIG. 18 is a detailed block diagram for another example of an MBO transcoder 220 shown in FIG. 13.
Figure 19:
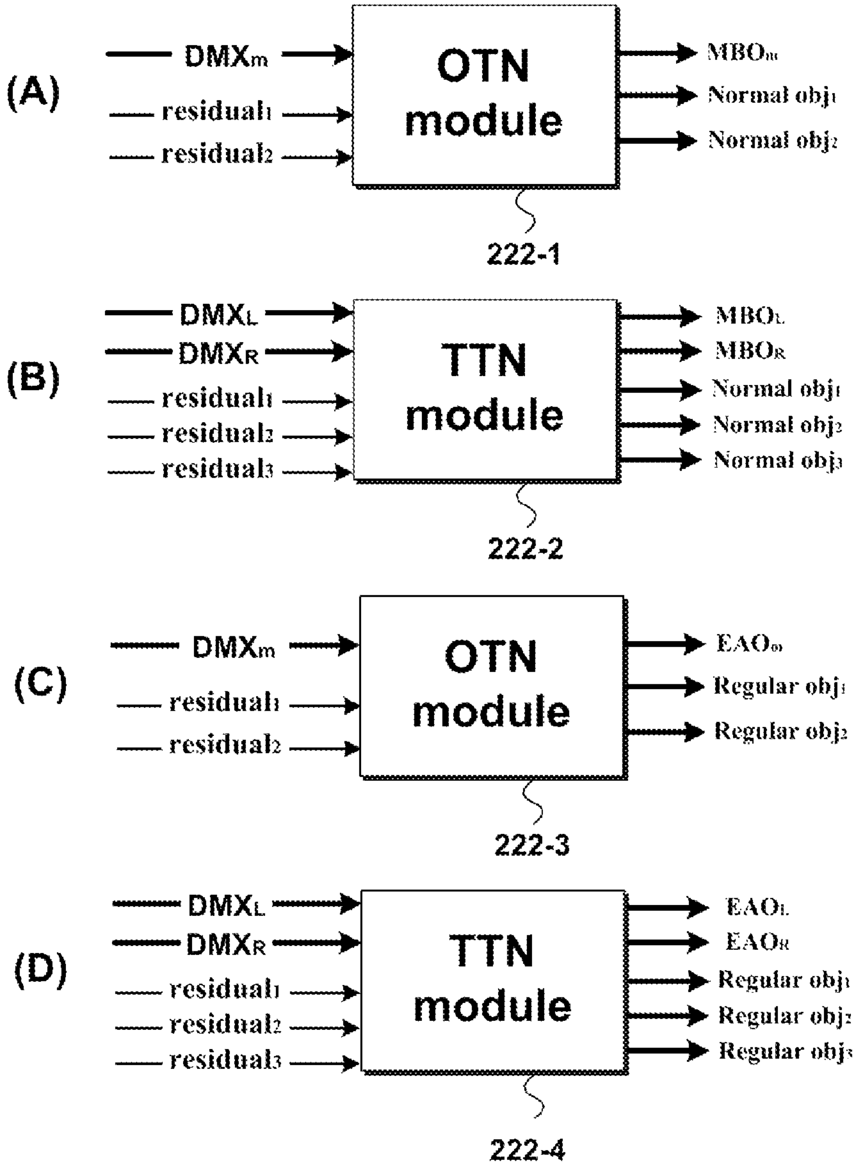
FIG. 19 is a detailed block diagram for examples of extracting units 222 respectively shown in FIG. 17 and FIG. 18.

FIG. 17 is a detailed block diagram for one example of the MBO transcoder 220 shown in FIG. 13. FIG. 18 is a detailed block diagram for another example of the MBO transcoder 220 shown in FIG. 13. And, FIG. 19 is a detailed block diagram for examples of the extracting units 222 respectively shown in FIG. 17 and FIG. 18.

First of all, an MBO transcoder (and a multichannel decoder) shown in FIG. 17 has the same configuration of FIG. 18. Yet, FIG. 17 relates to a mode (e.g., karaoke mode) for suppressing a normal object except MBO in objects included in a downmix signal, while FIG. 18 relates to a mode (e.g., solo mode) for rendering a normal object in a downmix signal only by suppressing MBO.

Referring to FIG. 17, the MBO transcoder 220 includes an extracting unit 222, a rendering unit 224 and a downmix processing unit 226 and can be connected to the multichannel decoder 230 shown in FIG. 13.

The extracting unit 222 extracts an MBO or a normal object from a downmix DMX using a residual (and object information). Examples of the extracting unit 222 are shown in FIG. 19. Referring to (A) of FIG. 19, OTN (one-to-N) module 222-1 is a module configured to generate N-channel output signal from 1-channel input signal. For instance, the OTN module 222-1 is able to extract mono MBO ($MBO_m$) and two normal objects (Normal $obj_1$ and Normal $obj_2$) from a mono downmix ($DMX_m$) using two residual signals ($residual_1$, $residual_2$). In this case, the number of residual signals can be equal to that of normal object signals. Referring to (B) of FIG. 19, TTN two-to-N) module 222-2 is a module configured to generate N-channel output signal from 2-channel input signal. For instance, the TTN module 222-2 is able to extract two MBO channels ($MBO_L$ and $MBO_R$) and three normal objects (Normal $obj_1$, Normal $obj_2$, Normal $obj_3$) from a stereo downmix ($DMX_L$, $DMX_R$).

Yet, when an encoder generates a residual signal, it is able to generate a residual not by setting an MBO to an enhanced audio object (EAO) as a background of a karaoke mode but by setting both MBO and normal object to EAO. Referring to © or (D) of FIG. 19, in case of using the residual generated in this manner, EAO ($EAO_m$, $EAO_L$, $EAO_R$) of mono or stereo channel is extracted and regular object (Regular $obj_N$), which is another object other than included in the EAO, can be extracted as well.

In the following description, explained is a case that MBO configures EAO in karaoke/solo mode, as shown in (A) and (B) of FIG. 19.

Referring now to FIG. 17, the MBO and normal object extracted by the extracting unit 220 is introduced into the rendering unit 224. And, the rendering unit 224 is able to suppress at least one of the MBO and the normal object based on rendering information (RI). In this case, the rendering information (RI) can include mode information that is the information for selecting one of general mode, karaoke mode and solo mode. The general mode is the information for selecting neither of the karaoke mode and the solo mode. The karaoke mode is the mode for suppressing objects except MBO (or EAO including MBO). And, the solo mode is the mode for suppressing MBO. Meanwhile, the rendering information (RI) can include mix information (MXI) itself or the information generated by the information generating unit 228 based on the mix information (MXI), by which the present invention is non-limited. The mix information shall be explained in detail with reference to FIG. 18.

If the rendering unit 224 suppresses a normal object except MBO, a karaoke mode MBO is outputted to the multichannel decoder 230. The information generating unit 228 does not generate downmix processing information (DPI) and second spatial information. Of course, the downmix processing unit 22 may not be activated. The received first spatial information is then delivered to the multichannel decoder 230.

The multichannel decoder 230 is able to upmix the MBO into a multichannel signal using the first spatial information. In particular, in case of the karaoke mode, the MBO transcoder 220 delivers the received spatial information and the MBO extracted from the downmix signal to the multichannel decoder.

FIG. 18 shows an operation of the MBO transcoder 220 in case of solo mode. Likewise, an extracting unit 222 extracts MBO and normal object form a downmix DMX. A rendering part 224 suppresses the MBO in case of solo mode using rendering information (RI) and delivers the normal object to a downmix processing part 226.

Meanwhile, an information generating unit 228 generates downmix processing information DPI using object information and mix information MXI. In this case, the mix information MXI is the information generated based on object position information, object gain information, playback configuration information and the like. Each of the object position information and the object gain information is the information for controlling an object included in the downmix. In this case, the object can conceptionally include EAO as well as the aforesaid normal object.

In particular, the object position information is the information inputted by a user to control a position or panning of each object. And, the object gain information is the information inputted by a user to control a gain of each object. Therefore, the object gain information can include gain control information on the EAO as well as gain control information on the normal object.

Meanwhile, the object position information and the object gain information can correspond to one selected from preset modes. In this case, the preset mode has predetermined values of object specific gain and position according to a time. And, preset mode information may have a value received from another device or can have a value stored in a device. Meanwhile, selection of one from at least one or more preset modes (e.g., not use preset mode, preset mode 1, preset mode 2, etc.) can be determined by a user input. The playback configuration information is the information including the number of speakers, positions of speakers, ambient information (virtual positions of speakers) and the like. The playback configuration information is inputted by a user, is stored in advance, or can be received from another device.

Meanwhile, as mentioned in the foregoing description, the mix information MXI can further include mode information that is the information for selecting one of general mode, karaoke mode and solo mode.

In case of a decoding mode, the information generating unit 228 is able to generate the downmix processing information DPI only. Yet, in case of a transcoding mode (i.e., a mode using a multichannel code), the information generating unit 228 generates second spatial information using object information and mix information MXI. Like the first spatial information, the second spatial information includes channel level difference, channel correlation information and the like. The first spatial information fails to reflect a function of controlling position and level of object. Yet, the second spatial information is generated based on the mix information MXI and enables a user to control position and level of each object.

If an output channel is multichannel and an input channel is mono channel, the information generating unit 228 may not generate the downmix processing information DPI. In this case, an input signal bypasses the downmix processing unit 226 and is then delivered to the multichannel decoder 230.

Meanwhile, the downmix processing unit 226 generates a processed downmix by performing processing on a normal object using the downmix processing information DPI. In this case, the processing is performed to adjust gain and panning of object without changing the number of input channels and the number of output channels. In case of a decoding mode (an output mode is mono channel, stereo channel or 3D stereo channel (binaural mode)), the downmix processing unit 226 outputs a tome-domain processed downmix as a final output signal (not shown in the drawing). Namely, the downmix processing unit 226 does not deliver the processed downmix to the multichannel decoder 230. On the contrary, in case of a transcoding mode (an output mode is multichannel), the downmix processing unit 226 delivers the processed downmix to the multichannel decoder 230. Meanwhile, the received first spatial information is not delivered to the multichannel decoder 230.

If so, the multichannel decoder 230 upmixes the processed downmix into a multichannel signal using the second spatial information generated by the information generating unit 228.

<Application Scenario for Karaoke Mode>

In karaoke mode or solo mode, an object is classified into a normal object and EAO. A lead vocal signal is a good example of a regular object and a karaoke track can become the EAO. Yet, strict limitation is not put on the EAO and the regular object. By virtue of the residual concept of TTN module, objects as many as 6 objects can be classified as high quality by the TTN module.

In karaoke mode or solo mode, a residual signal for each of the EAO and the regular object is necessary for separate quality. For this, the total bit rate number increases in proportion to the number of objects. In order to decrease the number of objects, objects need to be grouped into EAO and regular object. The objects grouped into the EAO and the normal object cannot be controlled individually at the cost of the bit efficiency.

Yet, in some application scenarios, it would be desired to have functionality of the high quality Karaoke, and at the same time, to have functionality of control each accompanying object with moderate level. Let assume a typical example of an interactive music remix cased where 5 stereo objects are exist (i.e., lead vocal, lead guitar, base guitar, drum and keyboard). In this case, the lead vocal forms a regular object and a mixture of the rest of 4 stereo object configures EAO. A user is able to enjoy a producer mix version (transported downmix), a karaoke version, and a solo version (a cappella version). Yet, in this case, it is unable to boost a base guitar or drum for user-preferred ‘megabass’ mode.

In a general mode, it is possible to control every object of a downmix using a rendering parameter to a general extent in spite of a small information size (e.g., bit rate of 3 kbps/object). Yet, a high quality of separation is not achieved. Meanwhile, it is possible to separate a normal object almost completely in karaoke or solo mode. Yet, the number of controllable objects is decremented. Therefore, an application is able to force either the general mode or the karaoke/solo mode to be exclusively selected. Thus, in order to fulfill the scenario request made by the application, it is able to propose the combination of advantages of the general mode and the karaoke/solo mode.

<Energy Mode in TTN Module>

First of all, in karaoke/solo mode, TTN matrix is obtained by a prediction mode and an energy mode. A residual signal is needed in the prediction mode. On the contrary, the energy mode is operable without a residual signal.

Apart from the concept of the karaoke/solo mode or EAO and regular signal, it is able to consider that there is no big difference between energy-based solo/residual mode and general mode. In two processing modes, object parameters are equal to each other but processed outputs are different from each other. In the general mode, a rendered signal is finally outputted. Yet, in the energy-based karaoke/solo mode, a separated object is outputted and a rendering post processing unit is further needed. Consequently, assuming that these two approaches do not discriminate output qualities from each other, two different descriptions exist in decoding an object stream. This brings confusion in interpretation and implementation.

Therefore, the present invention proposes to clarify the duplicity between the general mode and the energy-based karaoke/solo mode and to enable possible integration in-between.

<Information on Residual Signal>

Configuration of a residual signal is defined by ResidualConfig( ). And, the residual signal is carried on ResidualData( ). Yet, information indicating what kind of object has the residual signal applied to itself is not provided. In order to avoid this vagueness and the risk of mismatch between a residual and an object, an object bitstream is requested to carry additional information on the residual signal. This information can be inserted in ResidualConfig( ). Thus, it is proposed to provide the information on a residual signal, and more particularly, information indicating which object signal will have a residual signal applied to itself.

An audio signal processing apparatus according to the present invention is available for various products to use. Theses products can be mainly grouped into a stand alone group and a portable group. A TV, a monitor, a settop box and the like can be included in the stand alone group. And, a PMP, a mobile phone, a navigation system and the like can be included in the portable group.

Figure 20:
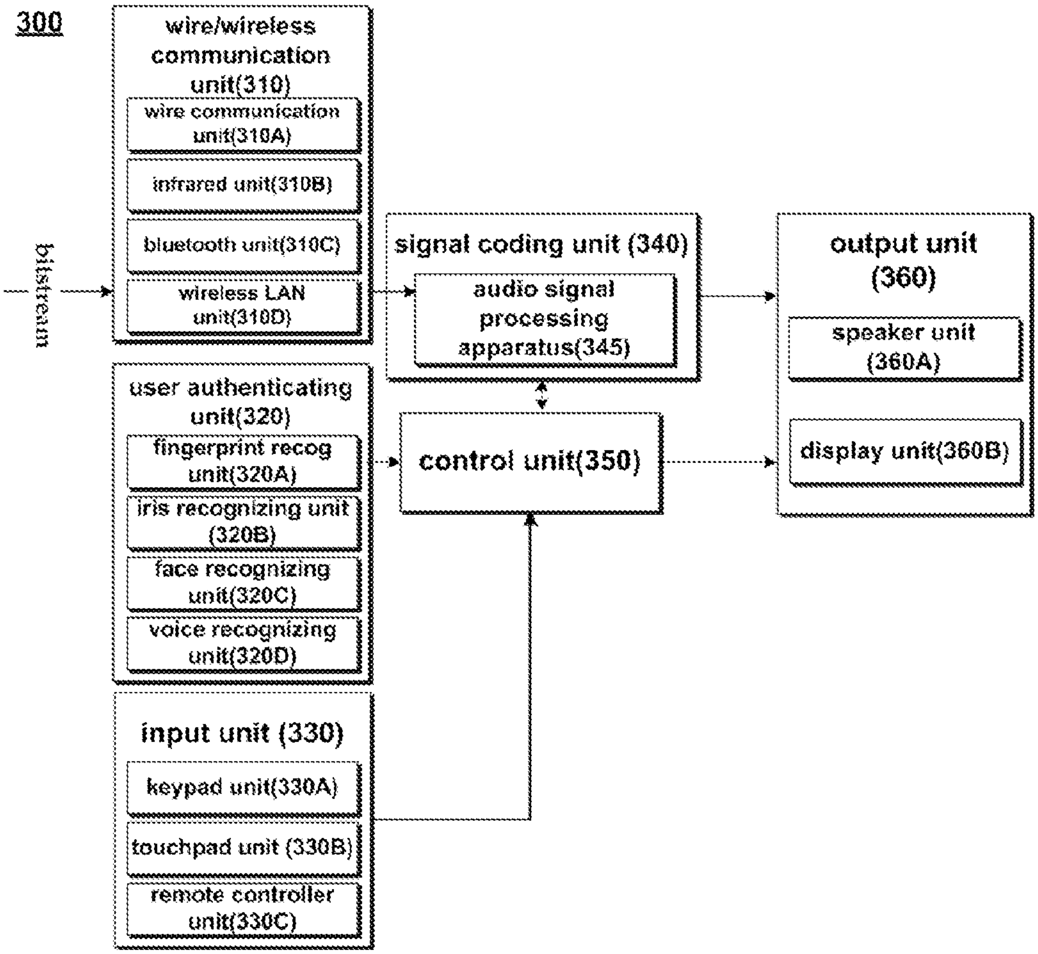
FIG. 20 is a schematic block diagram of a product in which an audio signal processing apparatus according to one embodiment of the present invention is implemented.

FIG. 20 is a schematic block diagram of a product in which an audio signal processing apparatus according to one embodiment of the present invention is implemented.

Referring to FIG. 20, a wire/wireless communication unit 310 receives a bitstream via wire/wireless communication system. In particular, the wire/wireless communication unit 310 can include at least one of a wire communication unit 310A, an infrared unit 310B, a Bluetooth unit 310C and a wireless LAN unit 310D.

A user authenticating unit 320 receives an input of user information and then performs user authentication. The user authenticating unit 320 can include at least one of a fingerprint recognizing unit 320A, an iris recognizing unit 320B, a face recognizing unit 320C and a voice recognizing unit 320D. The fingerprint recognizing unit 320A, the iris recognizing unit 320B, the face recognizing unit 320C and the voice recognizing unit 320D receive fingerprint information, iris information, face contour information and voice information and then convert them into user informations, respectively. Whether each of the user informations matches pre-registered user data is determined to perform the user authentication.

An input unit 330 is an input device enabling a user to input various kinds of commands and can include at least one of a keypad unit 330A, a touchpad unit 330B and a remote controller unit 330C, by which the present invention is non-limited.

A signal coding unit 340 performs encoding or decoding on an audio signal and/or a video signal, which is received via the wire/wireless communication unit 310, and then outputs an audio signal in time domain. The signal coding unit 340 includes an audio signal processing apparatus 345. As mentioned in the foregoing description, the audio signal processing apparatus 345 corresponds to the above-described embodiment (i.e., the encoder side 100 and/or the decoder side 200) of the present invention. Thus, the audio signal processing apparatus 345 and the signal coding unit including the same can be implemented by at least one or more processors.

A control unit 350 receives input signals from input devices and controls all processes of the signal decoding unit 340 and an output unit 360. In particular, the output unit 360 is an element configured to output an output signal generated by the signal decoding unit 340 and the like and can include a speaker unit 360A and a display unit 360B. If the output signal is an audio signal, it is outputted to a speaker. If the output signal is a video signal, it is outputted via a display.

FIG. 21 is a diagram for relations of products each of which is provided with an audio signal processing apparatus according to one embodiment of the present invention. Particularly, FIG. 21 shows the relation between a terminal and server, which correspond to the products shown in FIG. 20. Referring to (A) of FIG. 21, it can be observed that a first terminal 300.1 and a second terminal 300.2 can exchange data or bitstreams bi-directionally with each other via the wire/wireless communication units. Referring to (B) of FIG. 21, it can be observed that a server 500 and a first terminal 300.1 can perform wire/wireless communication with each other.

An audio signal processing method according to the present invention can be implemented into a computer-executable program and can be stored in a computer-readable recording medium. And, multimedia data having a data structure of the present invention can be stored in the computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the above mentioned encoding method can be stored in the computer-readable recording medium or can be transmitted via wire/wireless communication network.

Accordingly, the present invention provides the following effects and/or advantages.

First of all, the present invention is able to control gain panning of an object without limitation.

Secondly, the present invention is able to control gain and panning of an object based on a selection made by a user.

Thirdly, in case that a multichannel object downmixed into mono or stereo is included in a downmix signal, the present invention obtains spatial information corresponding to the multichannel object, thereby upmixing a mono or stereo object into a multichannel signal.

Fourthly, in case that either a vocal or background music is completely suppressed, the present invention is able to prevent distortion of a sound quality according to gain adjustment.

Accordingly, the present invention is applicable to encoding and decoding an audio signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for processing an audio signal, comprising:

receiving a downmix signal including at least one normal object signal, and a bitstream including object information determined when the downmix signal is generated;

extracting, from an extension part of the bitstream, an extension type identifier indicating whether the downmix signal further includes a multi-channel object signal;

generating spatial information using the object information and mix information when mode information indicates that the multi-channel object signal is to be suppressed and the extension type identifier indicates that the downmix signal further includes the multi-channel object signal; and transmitting the spatial information, wherein the mix information is to control an object position or an object level of the at least one normal object signal.

2. The method of claim 1, further comprising:

when the spatial information is generated, generating an output signal using the spatial information and the at least one normal object signal.

3. The method of claim 1, further comprising:

when the spatial information is transmitted, generating downmix processing information using the object information and the mix information; and generating a processed downmix signal by processing the at least one normal object signal using the downmix processing information.

4. An apparatus for processing an audio signal, comprising:

a receiving unit configured to receive a downmix signal including at least one normal object signal, and a bitstream including object information determined when the downmix signal is generated;

an extension type identifier extracting part configured to extract, from an extension part of the bitstream, an extension type identifier indicating whether the downmix signal further includes a multi-channel object signal;

a spatial information extracting part configured to generate spatial information using the object information and mix information when mode information indicates that the multi-channel object signal is to be suppressed and the extension type identifier indicates that the downmix signal further includes the multi-channel object signal; and a multi-channel object transcoder configured to transmit the spatial information, wherein the mix information is to control an object position or an object level of the at least one normal object signal.

5. The apparatus of claim 4, further comprising:

a multi-channel decoder configured to generate, when the spatial information is generated, an output signal using the spatial information and the at least one normal object signal.

6. The apparatus of claim 4, wherein the multi-channel object transcoder includes:

an information generating part configured to generate, when the spatial information is transmitted, downmix processing information using the object information and mix information; and a downmix processing part configured to generate a processed downmix signal by processing the at least one normal object signal using the downmix processing information.

7. A non-transitory computer-readable medium having instructions stored thereon, which, when executed by a processor, causes the processor to perform operations, comprising:

receiving a downmix signal including at least one normal object signal, and a bitstream including object information determined when the downmix signal is generated;

extracting, from an extension part of the bitstream, an extension type identifier indicating whether the downmix signal further includes a multi-channel object signal;

generating spatial information using the object information and mix information when mode information indicates that the multi-channel object signal is to be suppressed and the extension type identifier indicates that the downmix signal further includes the multi-channel object signal; and transmitting the spatial information, wherein the mix information is to control an object position or an object level of the at least one normal object signal.

* * * * *